United States Patent
Beard et al.

(10) Patent No.: US 9,181,984 B2
(45) Date of Patent: Nov. 10, 2015

(54) ALIGNMENT FEATURE FOR HUB AND DRIVESHAFT ASSEMBLY

(75) Inventors: Eli Beard, Tyler, TX (US); Ken Monroe, Lavaca, AR (US); Don Williamson, Poteau, OK (US); Walter Freeman, Hackett, AR (US)

(73) Assignee: Trane International Inc., Piscataway, NJ (US)

( * ) Notice: Subject to any disclaimer, the term of this patent is extended or adjusted under 35 U.S.C. 154(b) by 1198 days.

(21) Appl. No.: 12/023,172

(22) Filed: Jan. 31, 2008

(65) Prior Publication Data

US 2009/0196685 A1    Aug. 6, 2009

(51) Int. Cl.
F16D 1/072    (2006.01)
F16D 1/08     (2006.01)
F04D 29/26    (2006.01)
F04D 29/32    (2006.01)

(52) U.S. Cl.
CPC ............ *F16D 1/0847* (2013.01); *F04D 29/263* (2013.01); *F04D 29/325* (2013.01); *Y10T 403/7041* (2015.01)

(58) Field of Classification Search
USPC ....... 403/1, 13, 14, 280, 282, 383; 416/244 R
See application file for complete search history.

(56) References Cited

U.S. PATENT DOCUMENTS

| | | | | |
|---|---|---|---|---|
| 1,375,852 A * | 4/1921 | Linendoll | ............... | 29/525.08 |
| 2,080,361 A * | 5/1937 | Lindstrom | ............... | 403/202 |
| 2,882,077 A * | 4/1959 | Marsh | ............... | 403/383 |
| 3,240,517 A * | 3/1966 | Doyle | ............... | 403/362 |
| 3,339,831 A | 9/1967 | Ranz | | |
| 3,402,879 A | 9/1968 | Schroeter | | |
| 3,679,252 A * | 7/1972 | Howie, Jr. | ............... | 292/349 |
| 3,937,595 A * | 2/1976 | English et al. | ............. | 416/244 R |
| 4,009,970 A * | 3/1977 | Forth, Jr. | ............... | 416/134 R |
| 4,089,612 A * | 5/1978 | Mazzeo | ............... | 403/361 |
| 4,175,881 A * | 11/1979 | Loos | ............... | 403/13 |
| 4,760,752 A * | 8/1988 | Wield et al. | ............... | 74/434 |
| 5,855,444 A * | 1/1999 | Ohlson et al. | ............... | 403/13 |
| 6,186,710 B1 * | 2/2001 | Saniez et al. | ............... | 409/62 |
| 6,506,024 B1 * | 1/2003 | Thompson et al. | ........ | 416/244 R |
| 2003/0165354 A1 * | 9/2003 | Matt | ............... | 403/282 |

* cited by examiner

*Primary Examiner* — Joshua Kennedy
(74) *Attorney, Agent, or Firm* — Conley Rose, P.C.; J. Robert Brown, Jr.; Michael J. Schofield

(57) ABSTRACT

A hub-driveshaft assembly comprises a hub and driveshaft with a flat portion having a width. The hub comprises a body having an axial bore therethrough, a set screw hole extending radially through a wall of the body and communicating with the axial bore, and an alignment feature positioned near an entrance to the axial bore, wherein the alignment feature substantially aligns the flat portion of the driveshaft with the set screw hole when the driveshaft is inserted into the axial bore. In another embodiment, the hub comprises an alignment feature to promote proper alignment of the driveshaft with respect to the hub when the driveshaft is inserted into the axial bore, wherein the alignment feature is eliminated under load. In yet another embodiment, the hub comprises an alignment feature that flattens in response to loading from the driveshaft.

16 Claims, 7 Drawing Sheets

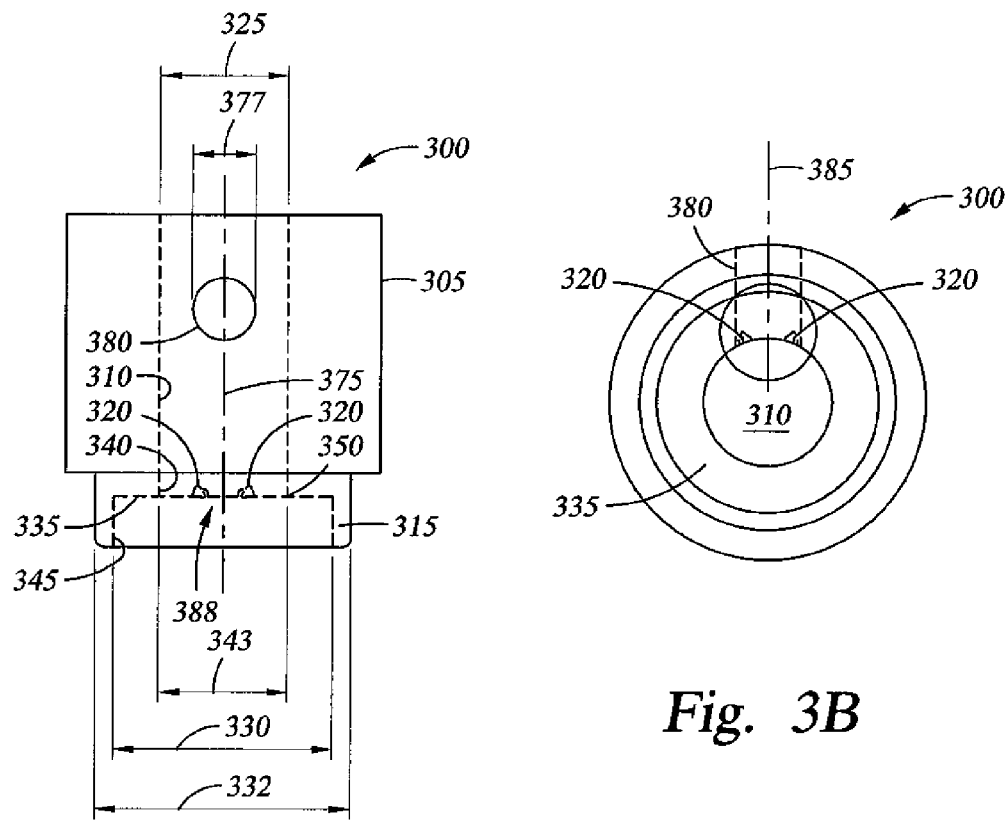
Fig. 3A
Fig. 3B
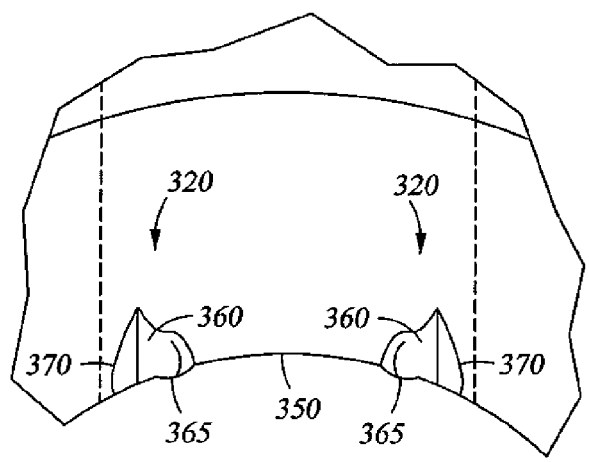
Fig. 3C
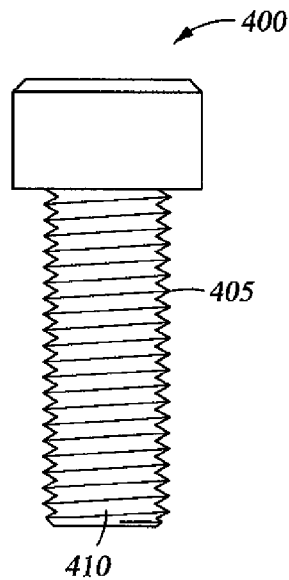
Fig. 4

ALIGNMENT FEATURE FOR HUB AND DRIVESHAFT ASSEMBLY

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

A typical fan assembly includes a cylindrical hub body with an axial bore therethrough, a spider with a plurality of arms extending outwardly from a cylindrical central portion connected to the hub body, and a plurality of blades attached to the spider arms. One end of a cylindrical rod, or driveshaft, is disposed within the axial bore in the hub and coupled to the hub body using a set screw or other connection device. In particular, the driveshaft is first inserted into the axial bore of the hub, and a set screw is inserted through a threaded hole in the wall of the hub that communicates with the axial bore. The set screw is then tightened against the driveshaft to prevent relative movement between the driveshaft and the hub. A drive unit, such as an electric motor, is coupled to the other end of the driveshaft and operates to transfer power to the hub in the form of torque by rotating the driveshaft. Due to the coupling of the driveshaft and the hub, the hub rotates, and the blades create movement of the surrounding air.

SUMMARY OF THE DISCLOSURE

An alignment feature for a hub and driveshaft assembly is disclosed. In some embodiments, the hub-driveshaft assembly comprises a hub and a driveshaft with a flat portion having a width. The hub comprises a body having an axial bore therethrough, a set screw hole extending radially through a wall of the body and communicating with the axial bore, and an alignment feature positioned near an entrance to the axial bore. In an embodiment, the alignment feature substantially aligns the flat portion of the driveshaft with the set screw hole when the driveshaft is inserted into the axial bore.

In other embodiments, the hub comprises a body having an axial bore therethrough and an alignment feature disposed in the body to promote proper alignment of a driveshaft with respect to the hub when the driveshaft is inserted into the axial bore, wherein the alignment feature is eliminated under load.

In still other embodiments, the hub comprises an alignment feature that enables proper alignment of a driveshaft with respect to a set screw hole in the hub, the alignment feature substantially flattening in response to loading from the driveshaft.

In another aspect, the present disclosure relates to methods for creating alignment features in a hub comprising engaging a punch tool with an interior surface of the hub, imparting force to the punch tool and impacting the surface of the hub with the punch tool to create the alignment features.

In yet another aspect, the present disclosure relates to methods for assembling a driveshaft within a hub comprising inserting the driveshaft into an axial bore through the hub by positioning a flat section of the driveshaft between two alignment features located on the hub, substantially aligning a portion of the flat section with a screw hole through the hub, inserting a screw through the screw hole to engage the flat section and tightening the screw against the flat section.

Thus, the alignment feature for a hub-driveshaft assembly and associated methods comprise a number of features. The various characteristics described above, as well as other features, will be readily apparent to those skilled in the art upon reading the following detailed description of the embodiments of the disclosure, and by referring to the accompanying drawings.

BRIEF DESCRIPTION OF THE DRAWINGS

For a more detailed description of the various embodiments of the alignment feature for a hub-driveshaft assembly, reference will now be made to the accompanying drawings, wherein:

FIG. 3A is a schematic top view of a representative embodiment of a hub comprising an alignment feature;

FIG. 3B is a schematic end view of the hub of FIG. 3A;

FIG. 3C is an enlarged view of the alignment feature of the hub of FIG. 3B;

FIG. 4 is a schematic side view of a representative set screw for coupling the driveshaft of FIGS. 2A-B within the hub of FIGS. 3A-C;

DETAILED DESCRIPTION

Figure 1A:
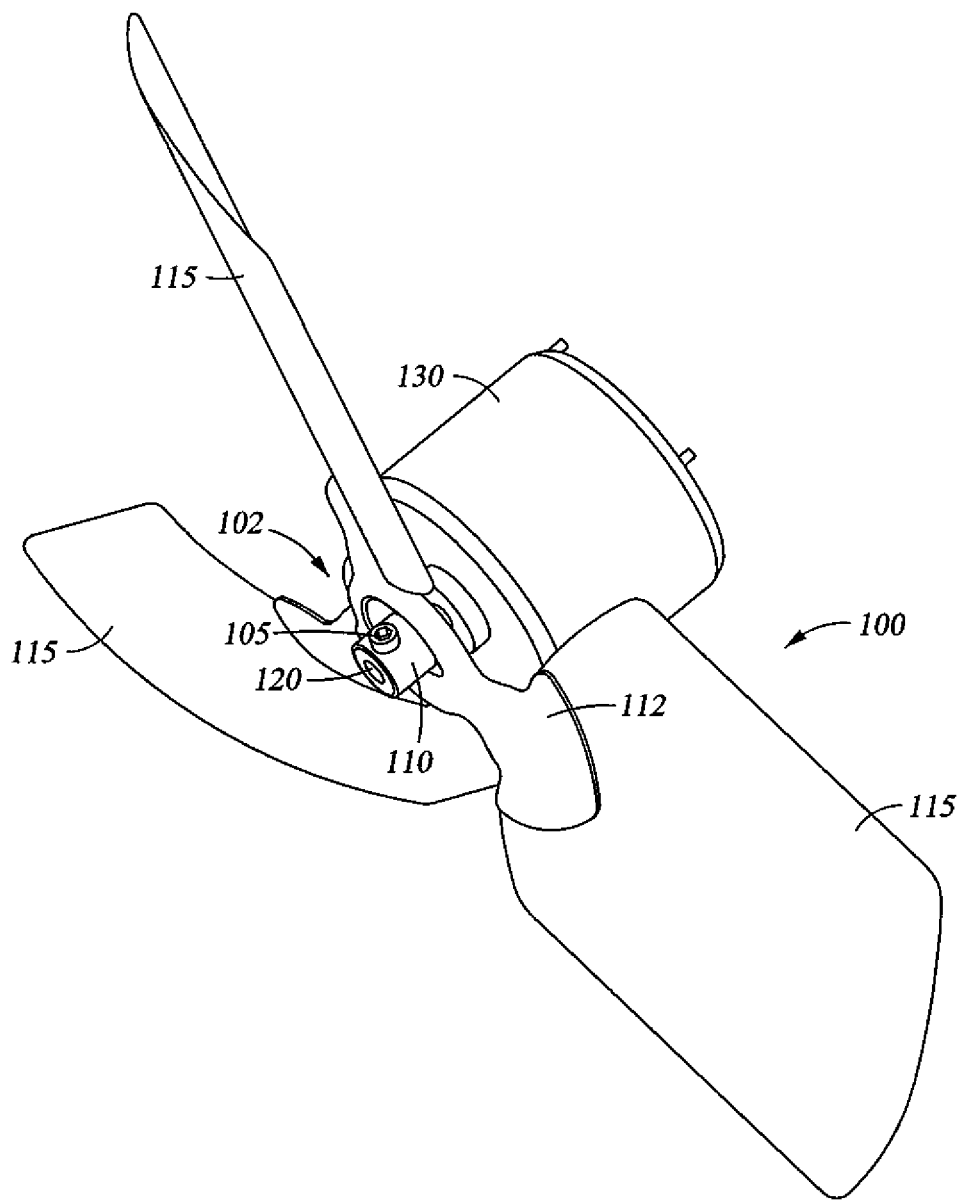
FIG. 1A is a schematic perspective view of a fan assembly comprising a representative embodiment of a hub-driveshaft assembly incorporating an alignment feature in accordance with the principles disclosed herein.

During fan operation, the efficiency of power transfer from a driveshaft to a hub is maximized when torque applied to the driveshaft by a drive unit is transferred to the hub with minimal loss. This occurs when there is relatively no movement in a connection between the driveshaft and the hub. To promote engagement between a set screw threaded into a hole through the hub wall and the driveshaft, and thus minimize movement in the connection between the driveshaft and the hub, a flat surface is typically machined into the end of the cylindrical driveshaft that is inserted into the axial bore of the hub. Then, during assembly, the driveshaft may be positioned within the axial bore of the hub so that the flat surface of the driveshaft aligns with the set screw hole, thereby allowing the set screw to engage the flat surface of the driveshaft when threaded into the set screw hole.

Misalignment of the driveshaft relative to the set screw occurs when the rounded portion of the driveshaft, rather than the flat portion, is positioned at the base of the set screw hole so that the set screw engages the rounded portion of the driveshaft. This misalignment may cause a number of problems. For example, when the set screw is installed, it may burr the driveshaft in the area where the pointed nose of the set screw engages the rounded portion of the driveshaft. Due to the tight tolerances between the driveshaft and the axial bore of the hub, a burr may inhibit disassembly of the driveshaft from the hub. Additionally, due to the driveshaft curvature and the shape of the set screw nose, the contact area between the set screw and driveshaft is small. As a result of driveshaft movement and this small contact area, the connection between the set screw and the driveshaft may loosen to allow slippage between the driveshaft and the hub. Such slippage results in inefficient power transfer from the driveshaft to the hub.

The present disclosure relates generally to apparatus and methods for aligning a hub and driveshaft assembly. More particularly, the present disclosure relates to an alignment feature for a hub and driveshaft assembly that promotes alignment of the driveshaft within the hub when the two components are assembled together. The alignment feature also promotes engagement of the driveshaft with the hub. Moreover, in at least one embodiment, the alignment feature prevents improper alignment of the driveshaft within the hub. During disassembly of the driveshaft from the hub, the alignment feature readily disengages to enable removal of the driveshaft from the hub with minimal damage to either component.

The alignment feature for a hub-driveshaft assembly is susceptible to embodiments of different forms. There are shown in the drawings, and herein will be described in detail, specific embodiments of the alignment feature for a hub-driveshaft assembly and associated methods with the understanding that the disclosure is to be considered representative only and is not intended to limit the apparatus and methods to that illustrated and described herein. In particular, various embodiments of the alignment feature for a hub-driveshaft assembly are described in the context of a fan. However, these components may be used in any application where it is desired to transfer power from a driveshaft to a hub in the form of torque or rotary motion. Thus, the hub-driveshaft assembly comprising an alignment feature may be utilized in, for example, a vehicle, an elevator or a blender, as well as a fan. It is to be fully recognized that the different teachings of the embodiments disclosed herein may be employed separately or in any suitable combination to produce desired results.

Figure 1B:
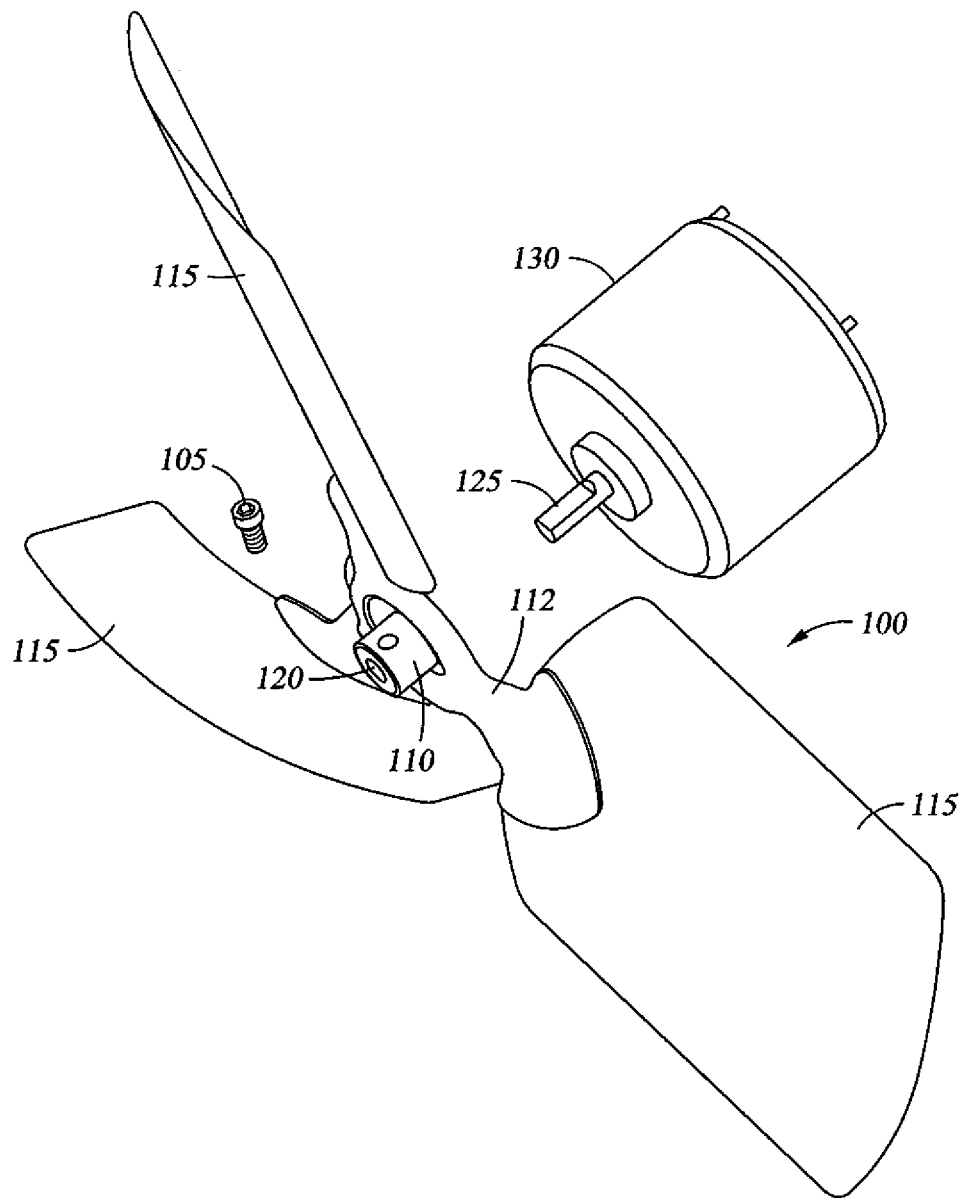
FIG. 1B is a schematic perspective view of the fan assembly of FIG. 1A, partially separated to depict its various components.

FIGS. 1A and 1B depict schematic perspective views of a fan assembly 100 in assembled and partially disassembled form, respectively; the fan assembly 100 comprising a representative embodiment of an aligned hub-driveshaft assembly 102. The aligned hub-driveshaft assembly 102 comprises a hub 110 having an axial bore 120 therethrough, a plurality of fan blades 115 coupled to the hub 110 by a spider 112, and a driveshaft 125 disposed partially within the axial bore 120 and coupled to the hub 110 by a set screw 105. Fan assembly 100 further comprises a drive unit 130 coupled to the driveshaft 125 and selectively operable to rotate the driveshaft 125. Drive unit 130 may comprise an electric motor or another type of motor, for example. Due to the coupling of the driveshaft 125 and hub 110 via the set screw 105, rotation of the driveshaft 125 by the drive unit 130 also causes rotation of the hub 110, the spider 112 and the blades 115, thereby creating movement of the surrounding air.

Figures 2A, 2B:
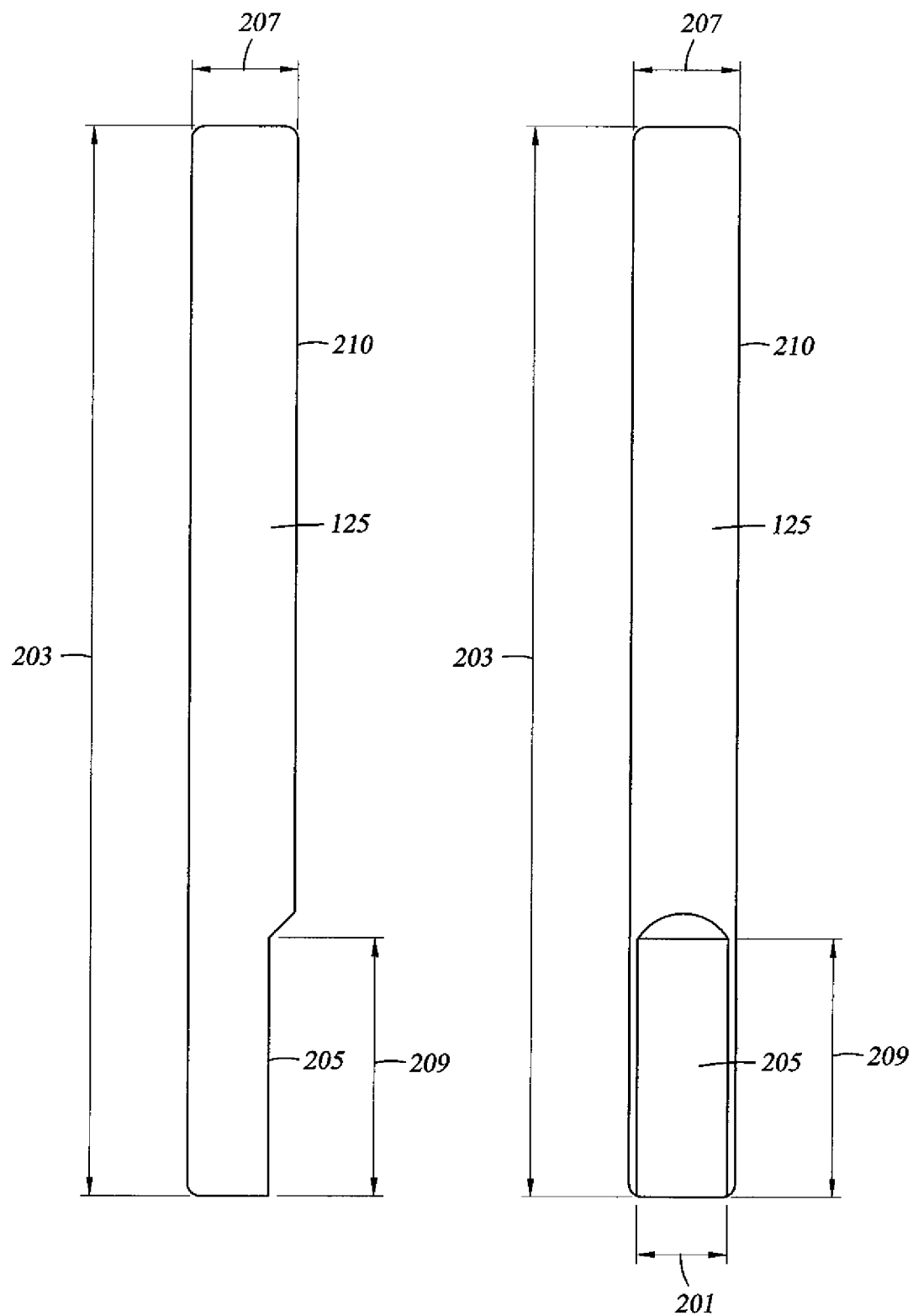
FIG. 2A is a schematic side view of a representative embodiment of a driveshaft.
FIG. 2B is a schematic top view of the driveshaft of FIG. 2A.

FIGS. 2A and 2B are schematic side and top views, respectively, of the driveshaft 125. As shown, the driveshaft 125 comprises a cylindrical body 210 having a length 203, a diameter 207 and a flat portion 205 along one end that has a length 209 and a width 201. Although the length 209 of the flat portion 205 extends along only a portion of the driveshaft length 203 in this representative embodiment, the length 209 of the flat portion 205 may be shorter or longer than shown, and even extend the full length 203 of the driveshaft 125, in other embodiments. In an embodiment, the driveshaft 125 comprises cold rolled steel, and the flat portion 205 may be created by machining or other process known in the industry. In at least some embodiments, the driveshaft 125 has a length 203 of about 6 inches and a diameter 207 of about 0.5 inches. In at least some embodiments, the flat portion 205 has a length 209 of about 2.25 inches and a width 201 of about 0.25 inches.

Driveshaft 125 may be coupled to a hub having alignment features in accordance with the principles disclosed herein to form the aligned hub-driveshaft assembly 102. FIGS. 3A and 3B are schematic top and end views, respectively, of a representative hub 300 having two alignment features 320, shown enlarged in FIG. 3C. In some embodiments, the hub 300 is formed of cold rolled steel. Hub 300 comprises a cylindrical body 305 having an axial bore 310 therethrough and a cylindrical extension 315 at an end. The diameter 325 of the axial bore 310 is sized to receive the driveshaft 125 therein. Thus, the axial bore diameter 325 is slightly larger than the driveshaft diameter 207 shown in FIGS. 2A and 2B.

Hub 300 further comprises a threaded hole 380 extending radially through a wall of the body 305, normal to the centerline 375 of the axial bore 310. The threaded hole 380 communicates with the axial bore 310 and enables coupling of the driveshaft 125 to the hub 300. In particular, after the driveshaft 125 is inserted into the axial bore 310 of the hub 300, a set screw, for example, may be inserted into the threaded hole 380 to engage the driveshaft 125, thereby forming a connection between the hub 300 and the driveshaft 125.

Hub 300 further comprises an extension 315 having an outer bore 345 and an adjacent inner bore 340 that connects to and aligns with the axial bore 310 of the body 305. The diameter 330 of the outer bore 345 is greater than the diameter 343 of the inner bore 340, which approximately equals the diameter 325 of the axial bore 310 in the body 305. This diametrical difference creates a recessed area 335 in the extension 315, and the intersection between the inner bore 340 and the outer bore 345 at the recessed area 335 forms a lip 350. In the embodiment shown, the hub 300 comprises two alignment features 320 positioned approximately along the lip 350, as shown in FIGS. 3B and 3C.

In the depicted embodiment, the alignment features 320 comprise two dents created in the lip 350 of the hub 300, each dent comprising a notch 360 adjacent at least one raised portion 365, as shown in FIG. 3C. One of ordinary skill in the art will also recognize that the alignment features 320 may be created in other locations near the inlet 388 to axial bore 310, such as along inner bore 340 adjacent lip 350, for example. In an embodiment, each raised portion 365 comprises hub material that has been displaced to create an adjacent notch 360, and each raised portion 365 protrudes radially into the diameter 343 of the inner bore 340. In other embodiments, the alignment features 320 may be formed by welding, adhering or otherwise adding material to the hub 300 to form raised portions 365 that protrude radially into the diameter 343 of the inner bore 340. Thus, the location and formation of the alignment features 320 may vary, so long as the raised portions 365 disengage or flatten in response to rotation of the driveshaft 125 within the hub axial bore 310 during disassembly, as described in more detail herein.

In an embodiment, the alignment features 320 are created in the hub 300 such that the distance between an outer edge 370 of one alignment feature 320 to an outer edge 370 of the other alignment feature 320, measured normal to the centerline 375 of the hub 300, is substantially equal to the width 201 of the flat portion 205 of the driveshaft 125. This spacing promotes alignment of the driveshaft 125 within the hub 300 when the flat portion 205 of the driveshaft 125 is disposed between the two alignment features 320 of the hub 300. Moreover, the two alignment features 320 may be created such that the set screw hole 380 is located approximately radially midway between the alignment features 320. This spacing ensures that the set screw engages the driveshaft 125 approximately in the center of the width 201 of the flat portion 205. Furthermore, in at least one embodiment, the alignment features 320 may extend radially into inner bore 340 such that the flat portion 205 is substantially aligned between the alignment features 320 when the driveshaft 125 is inserted into the axial bore 310 of the hub 300. Although two alignment features 320 are depicted in FIGS. 3B-3C, one of ordinary skill in the art will recognize that proper alignment of the driveshaft 125 within the hub 300 may be accomplished by providing one or more alignment features 320 within a radial area of the hub 300 defined by the width 201 of the flat portion 205, the radial area being centered on the set screw hole 380.

FIG. 4 is a schematic view of a representative set screw 400 that may be inserted through the threaded hole 380 of hub 300 to engage the driveshaft 125. Set screw 400 comprises a threaded body 405 configured to engage the threaded hole 380 and a nose 410 at an end of the threaded body 405. Nose 410 is shaped to promote engagement of the set screw 400 with the driveshaft 125. In some embodiments, the nose 410 is conically shaped as shown. However, other nose shapes may be equivalently used.

Figures 5A, 5B:
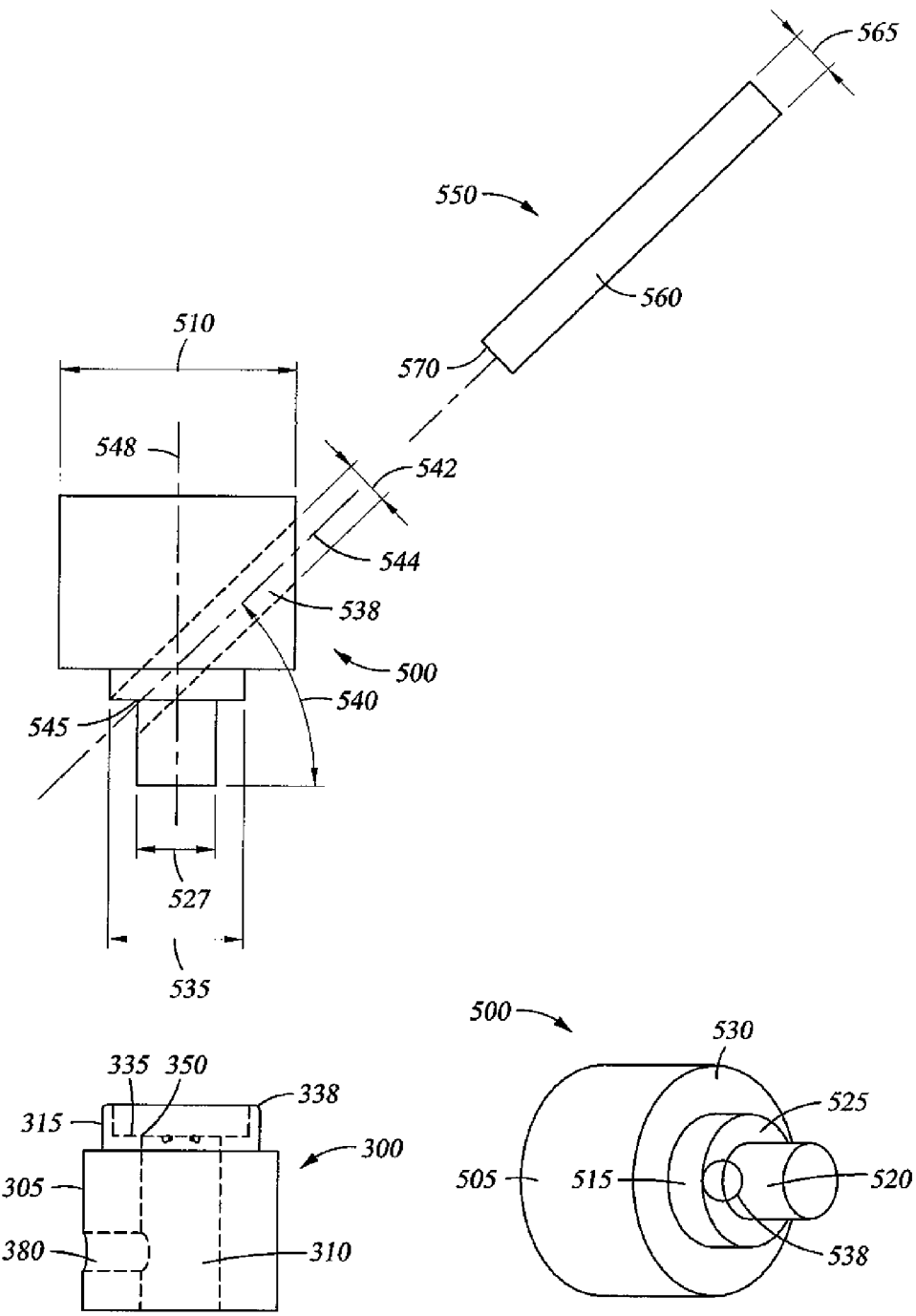
FIG. 5A is a schematic side view of a punch tool and a guide tool for creating the alignment feature depicted in FIGS. 3B-C.
FIG. 5B is another schematic side view of the guide tool of FIG. 5A.

FIGS. 5A and 5B illustrate representative tools that may be used to create the alignment features 320 in hub 300, although a variety of other tools may be equivalently used. For reference, hub 300 is also depicted in FIG. 5A. Referring to FIG. 5B, a guide tool 500 comprises three cylindrical sections, namely a trailing section 505, a leading section 520 and a midsection 515 positioned therebetween. The dimensions of the trailing section 505, midsection 515 and leading section 520 enable engagement of the guide tool 500 within the hub 300. In particular, when the guide tool leading section 520 is inserted into the axial bore 310 of the hub 300, the guide tool midsection 515 seats within the hub extension 315 by engaging the lower surface 525 of the guide tool midsection 515 with the recessed area 335 of the hub 300. The lower surface 530 of the guide tool trailing section 505 also engages the upper surface 338 of hub 300. Thus, the guide tool trailing section 505 has a diameter 510 greater than the outer diameter 332 (FIG. 3A) of the hub extension 315, and the guide tool leading section 520 has a diameter 527 smaller than the diameter 325 of the axial bore 310 through the hub body 305. Further, the guide tool midsection 515 has a diameter 535 smaller than the diameter 330 (FIG. 3A) of the outer bore 345 of the hub extension 315, but greater than the diameters 343, 325 of the inner bore 340 of the extension 315 and the axial bore 310 of the hub body 305, respectively.

Guide tool 500 further comprises an angled borehole 538 with a diameter 542, the angled borehole 538 disposed at angle 540 and extending through guide tool trailing section 505, guide tool midsection 515 and a portion of guide tool leading section 520. Angle 540 is chosen such that when the guide tool 500 is inserted into the hub 300, an end 545 of the angled borehole 538 encloses a portion of the lip 350 of the hub 300, and the centerline 544 of the angled borehole 538 intersects the lip 350. In some embodiments, angle 540 is 45 degrees from the axial centerline 548 of the guide tool 500.

Punch tool 550 is a cylindrical rod 560 having a diameter 565 and a concave nose 570. Punch tool 550 is configured for insertion into the angled borehole 538 of guide tool 500. Thus, the diameter 565 of punch tool 550 is smaller than the diameter 542 of the angled borehole 538. As will be described in more detail herein, the concave nose 570 creates alignment features 320 in hub 300 such that the alignment features 320 are spaced apart by a distance approximately equal to the width 201 of the flat portion 205 of the driveshaft 125. To create this spacing of the alignment features 320, the diameter 565 of punch tool 550 is substantially equal to the width 201 of the flat portion 205 of the driveshaft 125.

Figure 6:
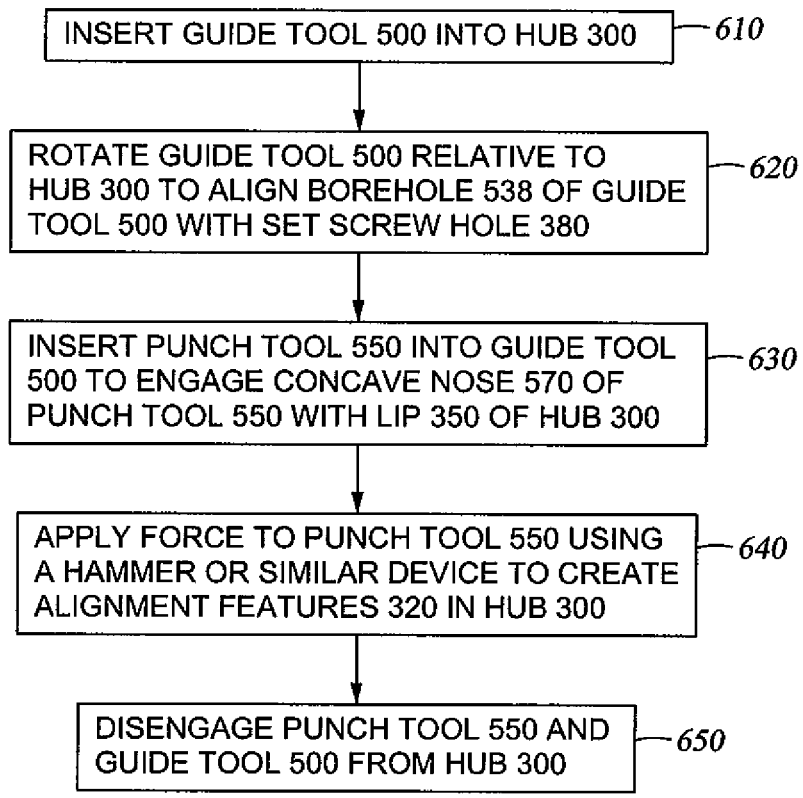
FIG. 6 is a flowchart of one representative method for creating alignment features in a hub using the guide tool and punch tool of FIGS. 5A-B.

FIG. 6 illustrates one embodiment of a method for creating alignment features 320 in hub 300 by using the guide tool 500 and punch tool 550. The method begins at block 610 by inserting guide tool 500 into hub 300, such that guide tool leading section 520 extends into axial bore 310 of hub 300, guide tool midsection 515 seats on the recessed area 335 of the hub extension 315, and guide tool trailing section 505 engages the upper surface 338 of the extension 315. At block 620, the guide tool 500 is rotated about its axial centerline 548 relative to hub 300 to align the centerline 544 of the angled borehole 538 with the centerline 385 of the set screw hole 380, thereby causing the set screw hole 380 to be positioned approximately radially midway between alignment features 320.

At block 630, the punch tool 550 is inserted into the angled borehole 538 of guide tool 500 such that the concave nose 570 of punch tool 550 engages the lip 350 of hub 300. At block 640, force is then applied to the other end of punch tool 550 using a hammer, mallet, or other equivalent device. The resulting impact of the concave nose 570 of punch tool 550 with the lip 350 of hub 300 creates two alignment features 320 in the lip 350. More specifically, as best depicted in FIG. 3C, the impact creates two dents or notches 360 by locally displacing hub material to either or both sides of the notches 360. The displaced hub material forms the raised portions 365 adjacent the notches 360. In alternate embodiments, rather than using the punch tool 550 as a separate device, the concave nose 570 or similar feature may be integrated into the guide tool 500 such that force may then be applied directly to the guide tool 500 to create the alignment features 320. At block 650, after alignment features 320 are created, guide tool 500 and punch tool 550 may be disengaged from hub 300, which is ready to receive the driveshaft 125.

Figure 7:
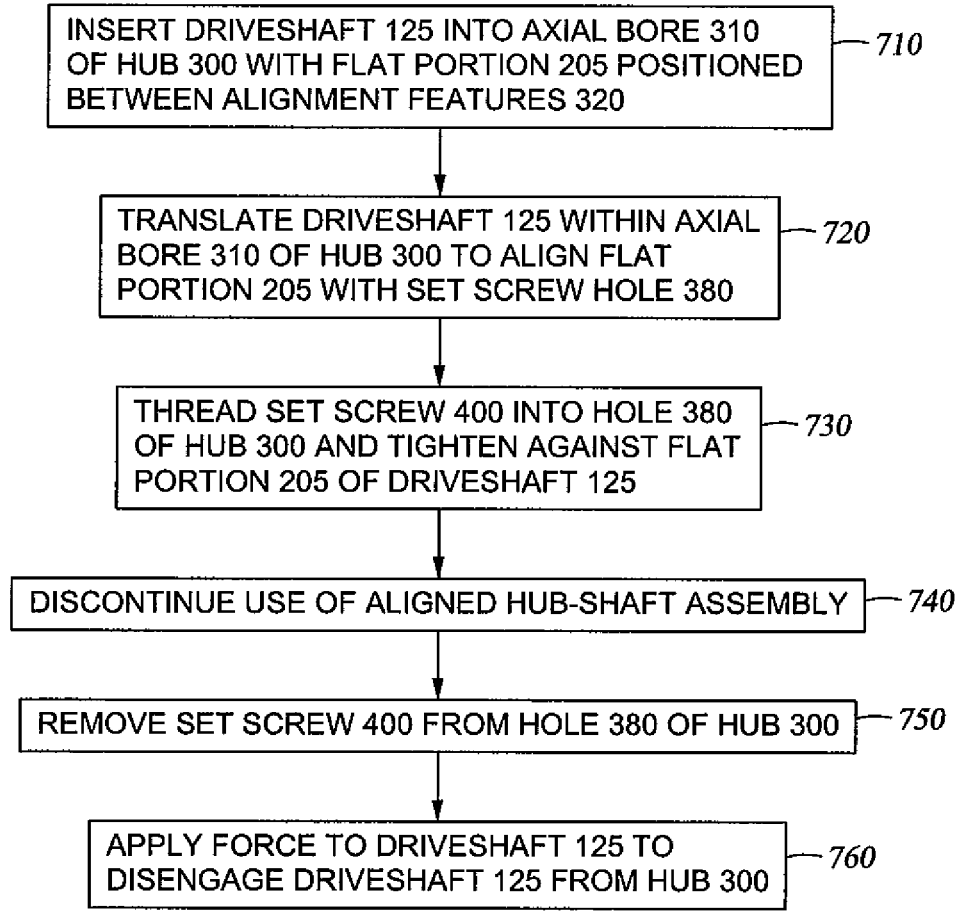
FIG. 7 is a flowchart of one representative method for assembling the driveshaft of FIGS. 2A-B within the hub of FIGS. 3A-C to form an aligned hub-driveshaft assembly.

FIG. 7 illustrates one embodiment of a method for assembling the driveshaft 125 within hub 300 to form an aligned hub-driveshaft assembly 102, wherein the driveshaft 125 is properly aligned within hub 300. FIG. 7 also illustrates one embodiment of a method for subsequently disassembling the driveshaft 125 from hub 300. The method begins at block 710 where the driveshaft 125 is inserted into the outer bore 345, inner bore 340 and axial bore 310 of hub 300. Because the alignment features 320 comprise raised portions 365 that extend into the inner bore 340 of the hub extension 315, the driveshaft 125 may be inserted into the hub 300 when the flat portion 205 of the driveshaft 125 is positioned between the alignment features 320 of hub 300, which are also positioned on either side of the set screw hole 380. Thus, the raised portions 365 of the alignment features 320 prevent misalignment caused by inserting the driveshaft 125 into the hub 300 with the rounded portion of the driveshaft 125 aligned with the set screw hole 380. The hub extension 315 is the receiving end of hub 300, while the other end is the exiting end of hub 300. In embodiments where the driveshaft 125 has a flat portion 205 extending the full length of the driveshaft 125, or where a flat portion 205 is provided at both ends of the driveshaft 125, then either end of the driveshaft 125 may be inserted into the receiving end of hub 300. Otherwise, the end of driveshaft 125 comprising the flat portion 205, namely the insert end of driveshaft 125, is inserted into the receiving end of hub 300.

At block 720, driveshaft 125 is then translated axially within the hub 300 to position the flat portion 205 below the set screw hole 380 of hub 300. In some embodiments, the driveshaft 125 may be long enough that the insert end of the driveshaft 125 extends to the exiting end of hub 300. In other embodiments, however, the driveshaft 125 may not be that long. To accommodate all embodiments of driveshafts 125, the alignment features 320 may be positioned at the receiving end, rather than the exiting end of hub 300. Positioning alignment features 320 on the receiving end of hub 300 promotes proper alignment between the driveshaft 125 and hub 300 by causing the flat portion 205 to be positioned between the alignment features 320, and thus aligned with the set screw hole 380. Positioning alignment features 320 on the receiving end of the hub 300 also promotes efficient and accurate assembly of the driveshaft 125 within the hub 300 since the assembler is not required to visually align the flat portion 205 with the set screw hole 380.

At block 730, once the flat portion 205 of the driveshaft 125 is aligned with the set screw hole 380 of hub 300, the set screw 400 is threaded into the hole 380 and tightened against the flat portion 205 of the driveshaft 125. This step completes assembly of the aligned hub-driveshaft assembly, and the hub-driveshaft assembly is ready for use.

At block 740, after some time, it may be desirable to discontinue use of the aligned hub-driveshaft assembly and disengage the driveshaft 125 from hub 300. To do so, at block 750 the set screw 400 is unthreaded from the set screw hole 380 of hub 300. Force, such as rotational force, is then applied to driveshaft 125 to disengage driveshaft 125 from hub 300.

When rotational force is applied to the driveshaft 125, the rounded portion of the driveshaft 125 reacts against the lip 350 of hub 300. As described above, the alignment features 320 extend radially into the inner bore 340 at the lip 350. Thus, when the driveshaft 125 reacts against the lip 350, the rounded portion of the driveshaft 125 exerts force against the raised portions 365 of the alignment features 320. Then the hub material that forms the raised portions 365 displaces under load from the driveshaft 125 back into the dents or notches 360, thereby flattening the alignment features 320. Subsequently, when driveshaft 125 translates axially within the axial bore 310 to be disengaged from hub 300, the alignment features 320 do not damage the driveshaft 125 because the raised portions 365 have been flattened. In contrast, had the alignment features 320 been created by the addition of material to hub 300, there would be no groove or dent into which the added material could displace under load from the driveshaft 125. As such, the added material would then resist loading from the driveshaft 125 and possibly damage the driveshaft 125, such as by gouging or cutting a groove in the driveshaft 125.

An alignment feature in accordance with the principles disclosed herein promotes proper alignment of a driveshaft within a hub, such that a set screw may be inserted through a threaded hole in the hub body to properly engage the driveshaft. In some embodiments, proper alignment of the driveshaft within the hub prevents burring of the driveshaft by the set screw so that subsequent disengagement of the driveshaft from the hub is not inhibited, and so that neither the driveshaft nor the hub is damaged during disassembly. Moreover, in some embodiments, proper alignment enables the set screw to more effectively engage the driveshaft, thereby forming a more secure coupling of the driveshaft to the hub. Such a secure coupling allows more efficient transfer of power from the driveshaft to the hub and substantially prevents the two components from slipping relative to each other, which would result in a reduction, or loss, of power transfer and necessitate maintenance of the hub-driveshaft assembly. In short, alignment features for a hub-driveshaft assembly promote more efficient power transfer for longer continuous periods of operation, and more readily enable disconnection of the assembly without damage to the driveshaft or the hub.

While various embodiments of the alignment feature, the aligned hub-driveshaft assembly and methods of construction and assembly have been shown and described, modifications thereof can be made by one skilled in the art without departing from the spirit or teaching of this disclosure. The embodiments described herein are representative only and are not limiting. Many variations and modifications of the apparatus and methods are possible and are within the scope of the disclosure. Accordingly, the scope of protection is not limited to the embodiments described herein, but is only limited by the claims which follow, the scope of which shall include all equivalents of the subject matter of the claims.

What is claimed is:

1. A hub and shaft assembly, comprising:
   a substantially cylindrical shaft comprising a recessed flat portion formed on a substantially cylindrical side of the shaft, the flat portion being associated with an insertion end of the shaft; and
   a hub configured to selectively receive a portion of the shaft, the hub comprising:
      a body having an axial bore therethrough, the axial bore being at least partially circumferentially bounded by an axial bore wall having an axial bore inner surface, the axial bore inner surface coinciding with a region of the axial bore wall at which a diameter of the axial bore wall is at a minimum;
      a shaft entry surface of the axial bore wall at least partially bounding an entry into the axial bore;
      a set screw hole that extends through the axial bore wall and at least partially defines a set screw opening into the axial bore;
      an alignment feature at least partially protruding from the axial bore inner surface and into the axial bore, at least a portion of the protruding portion of the alignment feature being located between the shaft entry surface of the axial bore wall and at least a portion of the set screw opening wherein upon an initial longitudinal insertion of the insertion end of the shaft into the axial bore past the shaft entry surface, a portion of the shaft is in longitudinal alignment with a portion of the axial bore inner surface and at least a portion of the protruding portion of the alignment feature is received in a space between the flat portion of the shaft and the axial bore inner surface; and
      a concavity of the axial bore wall having a concavity total volume substantially similar to an alignment feature total volume of the alignment feature, wherein the concavity total volume exists contemporaneously with the alignment feature total volume and wherein the concavity total volume is open through both the axial bore inner surface and the shaft entry surface; and
      wherein a longitudinal distance between at least a portion of the concavity and the set screw hole is less than a shortest longitudinal distance between the shaft entry surface and the set screw hole.

2. The hub and shaft assembly according to claim 1, further comprising:
a second alignment feature at least partially protruding from the axial bore inner surface and into the axial bore, at least a portion of the protruding portion of the second alignment feature being located between the shaft entry surface of the axial bore wall and at least a portion of the set screw opening.

3. The hub and shaft assembly according to claim 2, wherein the second alignment feature is substantially formed as a mirror image of the alignment feature.

4. The hub and shaft assembly according to claim 3, wherein the mirror image is formed relative to a bisection plane that substantially intersects at least one of a central axis of the axial bore and a central axis of the set screw hole.

5. The hub and shaft assembly according to claim 1, wherein the protrusion extends circumferentially along the axial bore inner surface, the protrusion comprising a circumferentially central peak that extends a maximum distance into the axial bore.

6. The hub and shaft assembly according to claim 1, further comprising:
a blade assembly interface of the axial bore wall at least partially located between the shaft entry surface of the axial bore wall and at least a portion of the set screw hole.

7. A hub and shaft assembly, comprising:
a shaft comprising a longitudinal flat portion associated with an insertion end of the shaft; and
a hub configured to selectively receive a portion of the shaft, the hub comprising:
a body having an axial bore therethrough, the axial bore being at least partially circumferentially bounded by an axial bore wall having an axial bore inner surface;
a shaft entry surface of the axial bore wall at least partially bounding an entry into the axial bore;
an alignment feature at least partially protruding from the axial bore inner surface and into the axial bore, the alignment feature comprising a protruding portion that extends circumferentially along the axial bore inner surface, the alignment feature being located and configured to resist receipt of the flat portion through the entry at least partially bounded by the shaft entry surface into the axial bore and into longitudinal alignment with the axial bore inner surface unless the shaft is angularly oriented relative to the alignment feature so that the flat portion generally faces the alignment feature; and
a concavity of the axial bore wall having a concavity total volume substantially similar to an alignment feature total volume of the alignment feature, wherein the concavity total volume exists contemporaneously with the alignment feature total volume, wherein the concavity extends from the drive-shaft entry surface longitudinally into the axial bore wall, and wherein the concavity total volume is accessible through both the axial bore inner surface and the shaft entry surface.

8. The hub and shaft assembly according to claim 7, further comprising:
a second alignment feature that is circumferentially offset from the alignment feature, the second alignment feature substantially being a mirror image of the alignment feature.

9. The hub and shaft assembly according to claim 8, further comprising:

a set screw hole that extends through the axial bore wall and at least partially defines a set screw opening into the axial bore;
wherein at least a portion of the alignment feature and the second alignment feature is located between the shaft entry surface of the axial bore wall and at least a portion of the set screw opening.

10. The hub and shaft assembly according to claim 7, further comprising:
a second alignment feature that is circumferentially offset from the alignment feature.

11. A hub and shaft assembly, comprising:
a shaft comprising a longitudinal flat portion associated with an insertion end of the shaft; and
a hub configured to selectively receive at least a portion of the shaft, the hub comprising:
a body having an axial bore therethrough, the axial bore being at least partially circumferentially bounded by an axial bore wall having an axial bore inner surface, the axial bore inner surface coinciding with a region of the axial bore wall at which a diameter of the axial bore wall is at a minimum;
a shaft entry surface of the axial bore wall at least partially bounding an entry into the axial bore;
an alignment feature at least partially protruding from the axial bore inner surface and into the axial bore, the alignment feature comprising a concavity that extends into the axial bore inner surface from the shaft entry surface of the axial bore wall, and a protrusion that extends into the axial bore from the axial bore inner surface, wherein the concavity has a concavity total volume substantially similar to an alignment feature total volume of the alignment feature, wherein the concavity total volume exists contemporaneously with the alignment feature total volume, and wherein the concavity extends beyond the shaft entry surface longitudinally into the axial bore wall; and
a second alignment feature at least partially protruding from the axial bore inner surface and into the axial bore, the second alignment feature being circumferentially offset from the alignment feature and the second alignment feature being substantially a mirror image of the alignment feature;
wherein the alignment feature and the second alignment feature are located and configured to resist receipt of the flat portion through the entry at least partially bounded by the shaft entry surface into the axial bore and into longitudinal alignment with the axial bore inner surface unless the shaft is angularly oriented relative to each of the alignment feature and the second alignment feature so that the flat portion generally faces each of the alignment feature and the second alignment feature; and
wherein the concavity total volume is open toward both the axial bore inner surface and the shaft entry surface.

12. The hub and shaft assembly according to claim 11, wherein at least one of the alignment feature and the second alignment feature comprises a protruding portion that extends circumferentially along the axial bore inner surface, the protruding portion comprising a substantially circumferentially central peak that extends a maximum distance into the axial bore.

13. The hub and shaft assembly according to claim 11, wherein the mirror image is formed relative to a bisection plane associated with a central axis of the axial bore.

14. The hub and shaft assembly according to claim 11, further comprising:

a set screw hole that extends through the axial bore wall and at least partially defines a set screw opening into the axial bore;

wherein the mirror image is formed relative to a bisection plane associated with a central axis of the set screw hole.

15. The hub and shaft assembly according to claim 11, further comprising:

a set screw hole that extends through the axial bore wall and at least partially defines a set screw opening into the axial bore;

wherein at least a portion of a protruding portion of at least one of the alignment feature and the second alignment feature is located between the shaft entry surface of the axial bore wall and at least a portion of the set screw opening.

16. A hub and shaft assembly, comprising:

a shaft comprising a longitudinal flat portion associated with an insertion end of the shaft; and a hub configured to selectively receive at least a portion of the shaft, the hub comprising:

a body having an axial bore therethrough, the axial bore being at least partially circumferentially bounded by an axial bore wall having an axial bore inner surface;

a shaft entry surface of the axial bore wall at least partially bounding an entry into the axial bore;

a set screw hole that extends through the axial bore wall and at least partially defines a set screw opening into the axial bore;

an alignment feature at least partially protruding from the axial bore inner surface and into the axial bore, at least a portion of a protruding portion of the alignment feature being located between the shaft entry surface of the axial bore wall and at least a portion of the set screw opening, wherein a concavity of the axial bore wall has a concavity total volume substantially similar to an alignment feature total volume of the alignment feature, wherein the concavity total volume exists contemporaneously with the alignment feature total volume, wherein a longitudinal distance between at least a portion of the concavity and the set screw hole is less than a shortest longitudinal distance between the shaft entry surface and the set screw hole, and wherein the concavity total volume is accessible via the axial bore inner surface and the shaft entry surface; and a second alignment feature substantially similar to the alignment feature and circumferentially offset from the alignment feature;

wherein insertion of the shaft into the axial bore and into longitudinal alignment with the axial bore inner wall through the entry at least partially bound by the shaft entry surface requires that the flat portion be oriented relative to the alignment feature and relative to the second alignment feature so that the flat portion generally faces each of the alignment feature and the second alignment feature prior to the flat portion being longitudinally aligned with a portion of the set screw hole.

\* \* \* \* \*